United States Patent Office 3,364,700
Patented Jan. 23, 1968

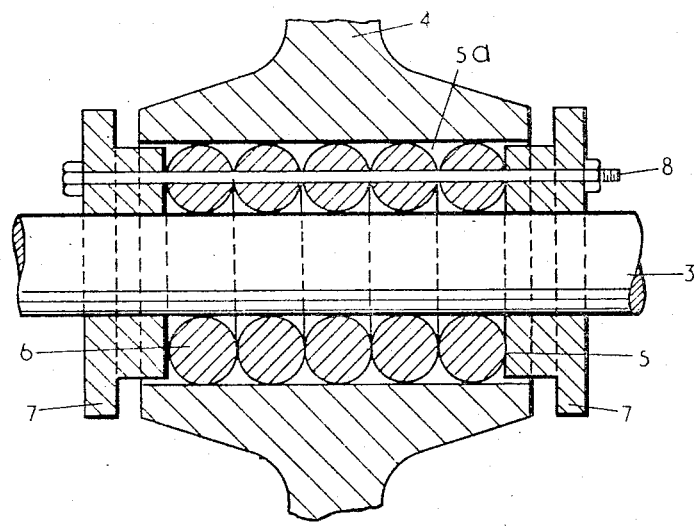
FIG. I.
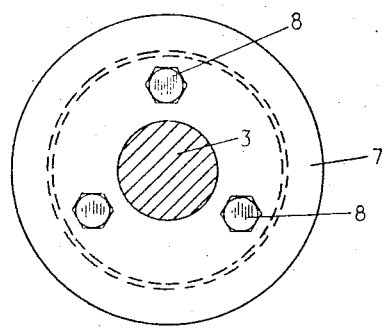
FIG. 2.
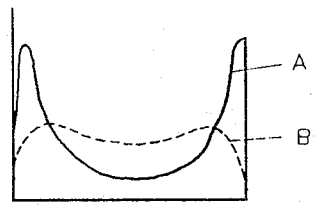
FIG. 3.

3,364,700
RESILIENT COUPLINGS
Leonard Gordon Davies, Guildford, Surrey, England, assignor to Matthews & Yates Limited, Swinton, England, a British company
Filed Jan. 7, 1966, Ser. No. 519,375
1 Claim. (Cl. 64—30)

ABSTRACT OF THE DISCLOSURE

A resilient hub in which a shaft passes through the hub with considerable annular clearance, a plurality of resilient rings of generally circular or oval cross-section provided to contact both the shaft and the hub, a ring or collar of rigid material provided at each end of the space between the shaft and hub, and draw bolts extending from one said ring of rigid material to the other to squeeze said plurality of resilient rings toward each other to deform them radially against said shaft and said hub so that the rings bear tightly against the shaft and the hub and entrap air or fluid between the rings.

---

This invention relates to a resilient coupling and has for its object to provide a simple and effective means of resiliently connecting a pair of rotatable members, for example, a shaft such as is used for an impeller and the hub or sleeve thereof.

The conventional way of making a flexible coupling with the aid of a solid resilient material, such as for instance, rubber, is to mold the rubber permanently into position between the driving and driven members or alternatively to adhesively attach the driving and driven members to an interposed rubber member. These arrangements suffer from the disadvantage that the driven and driving members cannot easily be taken apart without first destroying the initial bonding, nor can the interposed rubber member be easily and quickly removed should it deteriorate. The flexibility of the coupling is not great since solid rubber has a flexibility somewhat of an inverse ratio to the sheer strength which may be required for torque transmission purposes. To overcome some of these difficulties attempts have in the past been made whereby a rubber tube or a number of cylindrical rings has been inserted into the space between say a shaft and a wheel in order to transmit a torque from one to the other. Bearing friction between the two components has been achieved by various means for applying an axial load to the rubber tube or through discs in order that expansion takes place in both radial directions and thus provide a bearing load between the driving and driven members. This arrangement, while being in many ways an improvement on the former construction, unfortunately suffers from the disadvantage that the physical properties of the rubber, or some similar resilient material, are necessarily such that axial loads which are required to produce the necessary binding radial deformation become excessive, it is also very sensitive to axial deformation, i.e. degree of adjustment on the axial load producing mechanism, and there is a tendency also to bind prematurely during this tightening up process in the vicinity of the application of these loads.

The resilient coupling in accordance with the invention for transmitting rotational movement between the shaft and a surrounding sleeve or hub is one which comprises a number of resilient rings slidable on the shaft and forced against the shaft and the sleeve or hub by compression in the axial direction between two collars slidable over the shaft. Conveniently each collar is dished and is slidable on the shaft, the dished part being of such size that it fits closely within the hub or sleeve, and the remaining portion of the collar forming an outstanding flange. Axial compression may be applied to the rings by drawbolts which pass through the collars and rings. The rings are preferably of circular or elliptical cross section.

The invention is further described with reference to the drawing accompanying the specification in which:
FIGURE 1 is a sectional side elevation,
FIGURE 2 is an end view of FIGURE 1, and,
FIGURE 3 is a graph of the applied compressive stresses.

Referring to the drawing 3 indicates a driving shaft and 4 the hub of an impeller provided with an intermediate torque transmitting device 5 which comprises a number of rubber, or similar resilient rings 6 which are either of circular, elliptical or substantially circular cross-section and which are normally, free to slide onto the shaft 3 while able freely to clear the inside diameter of the hub 4. Axial loads are applied to the torque transmitting device 5 by means of collars 7 and bolts 8. The collars 7 have a cylinder body having a close fit within hub 4, and a portion of the collar forming an outstanding flange to be positioned axially of the hub. The bolts 8 extend in an axial direction through holes equally spaced along the annulus of the rings. The term "substantially circular" is is used to define the necessary convex cross-section of the rings to provide the spaces to entrap air, or other fluid, and is considered to include "elliptical."

Sufficient rings 6 are inserted so as to give a good clearance between the body of collars 7 and the hub 4 to allow ample room for axial deformation on the assembly of rings when pressure is applied by tightening bolts 8. An essential feature of the invention is that the flexible coupling provides air spaces between the driven and driving members which are partially or completely filled upon deformation of the rubber ring assembly upon compression.

For a given shore hardness of rubber or modulus of elasticity for any other resilient material from which the rings may be made, a greater axial compression can be achieved than had the rings been "solid" i.e. of square or rectangular cross-section, and greater accuracy of axial load control can be achieved. This would be of great importance in cases where a predetermined slip torque is desirable between the rings and the shaft. This increase in axial deflection for a given load over the "solid" rings is due to the fact that the circular or elliptical or other cross-section rings may deform into the adjacent spaces 6a immediately outside their surface peripheries and into the corresponding spaces next to the shaft, and deform into near-square or near-rectangular cross-sections under load, yet without appreciably altering their cross-sectional area.

Since the axially applied load is virtually applied to each ring at an annular line passing through pitch circle of the bolts 8 and is not applied to the whole side faces as it would be in the case of "solid" rings, instantaneous deformation will take place of the ring cross-sectional area at the commencement of application of this axial load and radial deformations are immediate as a result. This effect is more rapidly transmitted to all the rings than in the "solid" rings, partly because the rings are able to slide better with only line contact with the driving and driven components and the loads in a radial direction are much lower for a given axial displacement of the collars.

It is equally true for a given axial load (not displacement), the radially induced loads being applied at theoretically line contacts will provide a better grip on the shaft than a solid mass which fills the space since the bearing stresses are much higher in such case. Whereas in practice, it is not strictly true that friction is independent of the areas in contact, the tendency towards this law is always present.

In an arrangement whereby the compression of the rings is entirely due to tensile bolts 8 tension is easily pre-determined with a torque-spanner or some similar tool in the tightening-up of the nuts when pressure on the rings is applied from both ends. Since the friction torque supplied by the rings bears a singular law relationship to the applied compression of the rings for any given materials and selected area of rings, the slip torque can be predetermined.

The bolts 8 if independently adjusted can effect a certain degree of balancing as well as alignment of the hub 4 relative to the shaft 3.

By employing separate units, such as rings 6 as opposed to a solid tube, the rings have little contact with its adjacent boundaries and have a limited freedom of roll, and adjust themselves more easily to inaccuracies of manufacture (i.e. high or low spots) of machined parts, and indeed inaccuracies in the fmanufacture of the rings themselves as well as in non-concentricity of the hub and shaft, and therefore adjust themselves to receive, and consequently apply, a more homogeneous distribution of load.

In view of the fore-mentioned points it is claimed that, whereas application of axial load in the case of a "solid" tube or "solid" rings, the compressive stresses and consequently the friction bearing stresses will obey some curve such as A (FIGURE 3) it is claimed that the stresses in the case of the circular section or elliptical section rings as used in the present construction will be nearer that of curve B and hence more homogeneously distributed over the width of the hub of the wheel 4.

The importance of achieving near constant loading distribution cannot be over-emphasized. If this were not the case subsequent slip or successions of minute slips between the parts, or creep with time, might drastically alter the torque transmitting property of the unit, the slip torque being inevitably reduced.

In rings of circular or elliptical section air would normally be trapped in the spaces 6a between the rings and the boundaries of the driving and driven components.

On application of axial load to the assembly, air is trapped and compressed as well as providing some resiliance and also helps in reducing permanent fusion effects of the rings into the adjacent metals and in practice assists in lifting the rings away from the driving and driven components, on reduction of the axial compressive load for dismantling purposes.

It is visualised that, since rings of circular or elliptical section employ the interannular spaces in the assembly may be filled with protective in fluid form, the protective being trapped during the application of the compressive load. The fluid, apart from its duty of protecting the rubber (or other resilient material) from ageing or decomposition due to various causes, will also assist in providing sufficient lubrication to the rings during application of the axial load and thus provide the optimum in distribution of loading on the shaft and the hub internal surface.

Such fluid as suggested in the preceding paragraph will also undoubtedly assist in the dispersion of heat away from the shaft to a far greater degree than that resulting with the use of "solid" rings. As regards the conductivity of heat it should also be borne in mind that the bolts will contribute effectively to this end.

The coupling described for the transmission of torque between a shaft and a wheel (e.g. such as a fan) is self-contained and threading of the shaft or cutting of keyways is unnecessary, and the need for machining the cash hole in the hub or the ginding of the motor shaft is reduced or eliminated.

Whereas circular or elliptical section rings are referred to in the foregoing, it should be realised that any similar shape of cross-section which will provide a space between the ring surfaces and the surfaces of the adjacent components are based upon the same principles and may be employed.

Washers are provided at each end, for example of felt, to improve the sealing efficiency of the unit. A shaft and/or hub may be keyed or pinned as a safety measure to the assembly.

It will be appreciated that a resilient coupling as described above may be used for transmitting movement between a shaft and a surrounding sleeve or hub in either direction. Thus the shaft may be driving shaft and the sleeve or hub may be the hub or an impeller or of a pulley or gear wheel. Alternatively, the hub may be the hub of a gear wheel or chain sprocket or belt pulley which itself is driven from some other mechanism and from which the shaft is driven through the resilient coupling. It is also possible to locate inside the sleeve or hub the ends of two aligned shafts of identical diameter so that movement of one shaft transmitted to the other through the rings and surrounding sleeve or hub.

What is claimed is:

1. A resilient coupling for transmitting rotational movement between a shaft and a surrounding hub, in which the coupling comprises a number of resilient rings of substantially circular section which are slidable on the shaft to be forced against the shaft and the hub by axial compression, two flanged collars each having an apertured body slidable over the shaft at each end of said hub, the body of each collar having a close fit within the hub, and drawbolts passing through the rings and collars operable to apply axial pressure to the rings, the rings being so shaped that during axial compression air is trapped in spaces between adjacent rings and the shaft and between adjacent rings and the hub.

References Cited

UNITED STATES PATENTS

| | | | |
|---|---|---|---|
| 226,990 | 4/1880 | Edleblute | 152—49 |
| 635,231 | 10/1899 | Carmont | 152—49 |
| 1,223,788 | 4/1917 | Hauschild | 152—47 |
| 1,899,159 | 2/1933 | Krotee | 64—27 |
| 2,026,076 | 12/1935 | Spicer | 64—27 X |
| 2,160,445 | 5/1939 | Spicer | 64—27 X |
| 2,390,168 | 12/1945 | Piot | 64—27 |
| 2,561,103 | 7/1951 | Fawick | 64—27 |
| 2,751,987 | 6/1956 | Kiekhaefer | 64—30 |

MILTON KAUFMAN, *Primary Examiner.*

HALL C. COE, *Examiner.*